(12) United States Patent
Cramer et al.

(10) Patent No.: US 11,903,793 B2
(45) Date of Patent: Feb. 20, 2024

(54) MACHINE LEARNING DENTAL SEGMENTATION METHODS USING SPARSE VOXEL REPRESENTATIONS

(71) Applicant: Align Technology, Inc., San Jose, CA (US)

(72) Inventors: Christopher E. Cramer, Durham, NC (US); Roman Gudchenko, Moscow (RU); Dmitrii Ischeykin, Moscow (RU); Vasily Paraketsov, Moscow (RU); Sergey Grebenkin, Moscow (RU); Denis Durdin, Novosibirsk (RU); Dmitry Guskov, Moscow (RU); Nikolay Zhirnov, Moscow (RU); Mikhail Gorodilov, Novosibirsk (RU); Ivan Potapenko, Berdsk (RU); Anton Baskanov, Novosibirsk (RU); Elizaveta Ulianenko, Novosibirsk (RU); Alexander Vovchenko, Moscow (RU); Roman Solovyev, Novosibirsk (RU); Aleksandr Sergeevich Karsakov, Moscow (RU); Aleksandr Anikin, Moscow (RU); Mikhail Toporkov, Moscow (RU)

(73) Assignee: Align Technology, Inc., San Jose, CA (US)

( * ) Notice: Subject to any disclaimer, the term of this patent is extended or adjusted under 35 U.S.C. 154(b) by 353 days.

(21) Appl. No.: 17/138,824

(22) Filed: Dec. 30, 2020

(65) Prior Publication Data

US 2021/0196434 A1 Jul. 1, 2021

Related U.S. Application Data

(60) Provisional application No. 62/955,968, filed on Dec. 31, 2019.

(51) Int. Cl.
*A61C 9/00* (2006.01)
*A61C 13/34* (2006.01)
(Continued)

(52) U.S. Cl.
CPC ............ *A61C 9/0053* (2013.01); *A61C 13/34* (2013.01); *G06T 7/143* (2017.01); *G06T 17/20* (2013.01);
(Continued)

(58) Field of Classification Search
CPC ....... A61C 9/0053; A61C 13/34; G06T 7/143; G06T 17/20; G06T 2207/30036; G06T 2210/41
See application file for complete search history.

(56) References Cited

U.S. PATENT DOCUMENTS

| | | |
|---|---|---|
| 5,975,893 A | 11/1999 | Chishti et al. |
| 6,227,850 B1 | 5/2001 | Chishti et al. |

(Continued)

*Primary Examiner* — Nicholas D Lucchesi
(74) *Attorney, Agent, or Firm* — Shay Glenn LLP

(57) ABSTRACT

Methods for automatically segmenting a 3D model of a patient's teeth may include scanning a patient's dentition and converting the scan data into a 3D model, including a sparse voxel representation of the 3D model. Features can be extracted from the sparse voxel representation of the 3D model and input into a machine learning model to train the machine learning model to segment the 3D model into individual dental components.

11 Claims, 10 Drawing Sheets

(51) Int. Cl.
*G06T 7/143* (2017.01)
*G06T 17/20* (2006.01)
(52) U.S. Cl.
CPC ..... *G06T 2207/30036* (2013.01); *G06T 2210/41* (2013.01)

(56) References Cited

U.S. PATENT DOCUMENTS

| | | | |
|---|---|---|---|
| 6,227,851 B1 | 5/2001 | Chishti et al. |
| 6,299,440 B1 | 10/2001 | Phan et al. |
| 6,318,994 B1 | 11/2001 | Chishti et al. |
| 6,371,761 B1 | 4/2002 | Cheang et al. |
| 6,386,878 B1 | 5/2002 | Pavlovskaia et al. |
| 6,406,292 B1 | 6/2002 | Chishti et al. |
| 6,409,504 B1 | 6/2002 | Jones et al. |
| 6,457,972 B1 | 10/2002 | Chishti et al. |
| 6,488,499 B1 | 12/2002 | Miller |
| 6,514,074 B1 | 2/2003 | Chishti et al. |
| 6,554,611 B2 | 4/2003 | Chishti et al. |
| 6,582,229 B1 | 6/2003 | Miller et al. |
| 6,602,070 B2 | 8/2003 | Miller et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,492,245 B2 | 11/2016 | Sherwood et al. |
| 9,642,678 B2 | 5/2017 | Kuo |
| 10,248,883 B2 | 4/2019 | Borovinskih et al. |
| 10,342,638 B2 | 7/2019 | Kitching et al. |
| 10,463,452 B2 | 11/2019 | Matov et al. |
| 10,595,966 B2 | 3/2020 | Carrier, Jr. et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,956,635 B1 * | 3/2021 | Douglas ............... G06N 3/045 |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,417,071 B1 * | 8/2022 | Douglas ............... G06F 3/013 |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0050959 A1 * | 3/2006 | Grady ..................... G06T 7/12 382/173 |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0306724 A1 | 12/2008 | Kitching et al. |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0167243 A1 | 7/2010 | Spiridonov et al. |
| 2013/0204599 A1 | 8/2013 | Matov et al. |
| 2015/0235360 A1 * | 8/2015 | Zheng ................... G06F 18/24 382/128 |
| 2016/0135925 A1 | 5/2016 | Mason et al. |
| 2016/0242870 A1 | 8/2016 | Matov et al. |
| 2016/0310235 A1 | 10/2016 | Derakhshan et al. |
| 2017/0273760 A1 | 9/2017 | Morton et al. |
| 2018/0280118 A1 | 10/2018 | Cramer |
| 2019/0029784 A1 | 1/2019 | Moalem et al. |
| 2019/0053876 A1 | 2/2019 | Sterental et al. |
| 2019/0076214 A1 | 3/2019 | Nyukhtikov et al. |
| 2019/0175303 A1 | 6/2019 | Akopov et al. |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2019/0343601 A1 | 11/2019 | Roschin et al. |
| 2020/0000552 A1 | 1/2020 | Mednikov et al. |
| 2020/0000554 A1 | 1/2020 | Makarenkova et al. |
| 2020/0000555 A1 | 1/2020 | Yuryev et al. |
| 2020/0085546 A1 | 3/2020 | Li et al. |
| 2020/0105028 A1 | 4/2020 | Gao et al. |
| 2020/0107915 A1 | 4/2020 | Roschin et al. |
| 2020/0155274 A1 | 5/2020 | Pimenov et al. |
| 2020/0214800 A1 | 7/2020 | Matov et al. |
| 2020/0297458 A1 | 9/2020 | Roschin et al. |
| 2020/0306011 A1 | 10/2020 | Chekhonin et al. |

(56) References Cited

U.S. PATENT DOCUMENTS

| | | |
|---|---|---|
| 2020/0306012 A1 | 10/2020 | Roschin et al. |
| 2020/0315744 A1 | 10/2020 | Cramer |
| 2020/0360109 A1 | 11/2020 | Gao et al. |
| 2021/0073998 A1 | 3/2021 | Brown et al. |
| 2021/0134436 A1 | 5/2021 | Meyer et al. |
| 2021/0174477 A1 | 6/2021 | Shi et al. |
| 2022/0180602 A1* | 6/2022 | Hao ................ G06T 11/00 |
| 2022/0189611 A1* | 6/2022 | Farkash ............ A61B 1/0684 |
| 2022/0262007 A1* | 8/2022 | Cramer ............ G06V 10/774 |
| 2023/0014934 A1* | 1/2023 | Mezghanni ......... G06F 30/27 |

\* cited by examiner

MACHINE LEARNING DENTAL SEGMENTATION METHODS USING SPARSE VOXEL REPRESENTATIONS

CLAIM OF PRIORITY

This application claims priority to U.S. Provisional Patent Application No. 62/955,968, titled "MACHINE LEARNING DENTAL SEGMENTATION SYSTEM AND METHODS USING SPARSE VOXEL REPRESENTATIONS," filed on Dec. 31, 2019 which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

Orthodontic procedures typically involve repositioning a patient's teeth to a desired arrangement in order to correct malocclusions and/or improve aesthetics. To achieve these objectives, orthodontic appliances such as braces, shell aligners, and the like can be applied to the patient's teeth by an orthodontic practitioner and/or by the patients themselves. The appliance can be configured to exert force on one or more teeth in order to effect desired tooth movements according to a treatment plan.

Orthodontic aligners may include devices that are removable and/or replaceable over the teeth. Orthodontic aligners may be provided as part of an orthodontic treatment plan. In some orthodontic treatment plans involving removable and/or replaceable aligners, a patient may be provided plurality of orthodontic aligners over the course of treatment to make incremental position adjustments to the patient's teeth. An orthodontic aligner may have a polymeric trough with an inner cavity shaped to receive and resiliently reposition teeth from one tooth arrangement to a successive tooth arrangement. Orthodontic aligners may include "active" regions that impose repositioning forces on teeth and "passive" regions that retain teeth in their current state.

Many digital scan technologies use automated tooth segmentation systems (e.g., automated systems that identify and/or number individual teeth and/or dental features in a dental model). Unfortunately, individual teeth and additional dental features such as the gingiva or interproximal spaces between teeth be misidentified or missed entirely by automated tooth segmentation systems and/or conventional digital scanning technologies. Additionally, many of these automated tooth segmentation systems still require significant input from a technician to correctly segment the teeth.

To date, there has been a great deal of work performed on 2D semantic segmentation (i.e., the segmentation of images into specific, labeled components). There has been significantly less work in 3D due to the enormous memory requirements (e.g., a medium-resolution image might contain 512×512 pixels, so to achieve the same resolution in voxels a system may require more than 256 times that amount of memory. It would be particularly helpful to provide one or more tools that may aid in analyzing and or guiding treatments that may automatically and accurately segment teeth, particularly in 3D.

SUMMARY OF THE DISCLOSURE

Described herein are methods and apparatuses (e.g., systems, including software and/or firmware) that provide an automated tooth segmentation system to automatically, effectively, and accurately segment individual teeth and dental features from a scan or 3D mesh of a patient's detention, with a high degree of accuracy. The present application addresses technical problems by providing technical solutions and/or automated agents that automatically segment teeth and dental features using machine learning neural networks. In some implementations, segmentation is performed with a set of 3D convolutional neural networks that uses an efficient, sparse, voxel-based representation of the 3D mesh. Automatic tooth segmentation may provide the basis for implementation of automated orthodontic treatment plans, design and/or manufacture of orthodontic aligners (including series of polymeric orthodontic aligners that provide forces to correct malocclusions in patients' teeth). These apparatuses and/or methods may provide or modify a treatment plan, including an orthodontic treatment plan. The apparatuses and/or methods described herein may provide instructions to generate and/or may generate a set or series of aligners, and/or orthodontic treatment plans using orthodontic aligners that incorporate post-treatment tooth position scoring. The apparatuses and/or methods described herein may provide a visual representation of the patient's teeth including the post-treatment tooth position scoring.

In general, example apparatuses (e.g., devices, systems, etc.) and/or methods described herein may acquire a representation of a patient's teeth. The representation may be a 3D model of the patient's teeth (e.g., a 3D tooth point cloud or a 3D mesh). In some implementations, a subset of the 3D model (e.g., a specific number of points representing each tooth) can be used as the input.

Furthermore, example apparatuses (e.g., devices, systems, etc.) and/or methods described herein may convert the 3D models into sparse voxel representations comprising voxels with unique voxel geometries that represent the patients' dentitions. Example apparatuses can further implement automated agents to compute features for each voxel based on the 3D mesh or point cloud features that were mapped to each voxel. These computed features can additionally be normalized (e.g., subtracting the mean and dividing by the standard deviation).

In general, example apparatuses (e.g., devices, systems, etc.) and/or methods described herein may use the computed features in the sparse voxel representations to train a machine learning model to recognize "segmentation elements" corresponding to segmentation of patient's dentition. Examples of machine learning systems that may be used include, but are not limited to, Convolutional Neural Networks (CNN) such as U-Net, ResNeXt, Xception, RefineNet, Kd-Net, SO Net, Point Net, or Point CNN, and additional machine learning systems such as Decision Tree, Random Forest, Logistic Regression, Support Vector Machine, AdaBoosT, K-Nearest Neighbor (KNN), Quadratic Discriminant Analysis, Neural Network, etc.

Once the machine learning systems have been trained, they can be used to generate a segmented model of the patient's detention. The machine learning models can be configured to apply ground truth labeling when generating an output data set or a segmentation result.

Any of the apparatuses and/or methods described herein may be part of a distal tooth scanning apparatus or method, or may be configured to work with a digital scanning apparatus or method.

These method and apparatuses represent a technical advancement over existing methods and systems. Segmentation of 3D objects into specific, labeled components is typically difficult and computationally expensive. Segmentation of 3D objects requires enormous memory requirements. For example, a medium-resolution image might contain 512×512 pixels; to achieve the same resolution in voxels, one might require more than 256 times that amount of memory. The method and apparatuses described herein may reduce the memory constraints by orders of magnitude. By storing the voxel representation sparsely, significantly less memory may be needed for a 3D representation and by only operating the convolutions on the manifold (i.e., the non-empty voxels), excess computation is avoided.

Thus described herein are methods and apparatuses that use sparse voxel-based convolution for segmentation of dental models. By using 3D convolutions, a variety of approaches become available. A 3D model (e.g., a point cloud and/or a mesh representation of the dentition) may first be converted into a sparse voxel representation and features are computed for each voxel based on the mesh features that were mapped to each voxel. Features can be computed based on properties of the mesh, for example, the sum of the normals of the mesh faces which map to the voxel, the count of faces mapped to the voxel, the sum of the area, the average of the angles, etc. All such features can contribute to the convolutional neural network and are analogous to the Red, Green, and Blue color channels used in images. Such features can also be normalized (e.g., subtracting the mean and dividing by the standard deviation).

Any of the methods and apparatuses (e.g., systems) described herein may include a trained machine learning model; the methods and systems described herein may include training (one time or in an ongoing manner) the machine learning model (also referred to herein as a machine learning agent), or they may use a trained machine learning model to output a segmented model of all or a portion of a subject's (e.g., a patient's) dentition, such as the subject's teeth, gingiva, palate, etc.

For example, described herein are methods including training a machine learning model to segment a 3D dental model, the method comprising: receiving, in a computing device, a three-dimensional (3D) model of a patient's dentition; converting the 3D model into a sparse voxel representation comprising voxels encoding geometries of the patient's dentition; computing features for each voxel based on 3D model features mapped onto that voxel; and applying the computed features to train a machine learning model to recognize segmentation elements corresponding to segmentation of the patient's dentition. All of these steps may be performed in the computing device, or a distributed computing device(s).

The three-dimensional (3D) model of a patient's dentition may include one or more of a point cloud representation of the patient's dentition and/or a mesh representation of the patient's dentition. The voxels may encode geometries of the patient's dentition in the voxel information, including a voxel feature encoding layer(s).

Any of the methods described herein may include segmenting a 3D model (e.g., new, as compared to the 3D models used for training) of a patient's dentition (e.g., a second or new patient) into individual dental components with the machine learning model to form a segmented new 3D model of the second patient's dentition. Thus, any of these methods may apply the trained machined learning agent to analyze (e.g., segment, determine tooth numbering, determining interproximal tooth spacing, etc.) a previously analyzed patient. In some methods the training steps have been previously performed and are not necessary for the method.

In any of the method described herein, the 3D model may include a scan of the patient's dentition, such as an intraoral scan.

In general, the training may include iterating with additional ground information. For example the method may include repeating the receiving, converting, computing, and applying steps for a plurality of 3D models of patients' dentitions. This iteration may improve the trained network.

The sparse voxel representation may consider a voxel in every location of the 3D model that contains a vertex. In some examples, each voxel of the sparse voxel representation may be represented in 3D space as (x, y, z, D) where D comprises data corresponding to a feature of the voxel. For example, data comprising a 1 may be used to indicate that a voxel is present at that location in the sparse voxel representation. The data may comprise a set of geometric properties of the 3D model converted onto that voxel.

In any of the methods described herein, computing the features may include a sum of normals of the 3D model converted to each voxel, and/or a count of faces the 3D model converted to each voxel, and/or a sum of areas of the 3D model converted to each voxel, and/or an average of angles of the 3D model converted to each voxel. Applying the computed features comprises applying the computed features to train a submanifold sparse convolutional network to recognize segmentation elements. Applying the computed features may include training a submanifold sparse convolutional network to recognize segmentation elements.

Any of these methods may include applying the computed features to train a dense convolutional network when a size of the computed features has been reduced to a predetermined value.

In some examples the machine learning model is trained to construct a semantic segmentation network in which multiple objects of a same class are treated as a single entity. The machine learning model may be trained to construct an instance segmentation network in which multiple objects of a same class are treated as distinct individual objects or instances. Converting the 3D model into a sparse voxel representation may include converting the 3D model into a sparse voxel representation comprising a two-dimensional model.

Any of these methods may include performing algorithmic postprocessing on new 3D model of the second patient's dentition to improve segmentation or tooth number, or segmentation and tooth numbering.

For example, a method may include: receiving, in a computing device, a three-dimensional (3D) model of a patient's dentition; converting the 3D model into a sparse voxel representation comprising voxels that represent a geometry of the patient's dentition; receiving a ground truth input comprising a segmentation of the 3D model; training a machine learning model of the computing device produce a segmentation output using the ground truth input and the sparse voxel representation. Any of these methods may also include segmenting a new 3D model of a second patient's dentition into individual dental components with the trained machine learning model to form a new segmented 3D model of the second patient's dentition.

For example, any of these methods may include identifying interproximal spaces between teeth of the new 3D model of the second patient's dentition with the trained machine learning model, and/or identifying individual teeth of the new 3D model of the second patient's dentition with the trained machine learning model. The methods described herein may include adjusting a size and/or shape of individual teeth of the new segmented 3D model of the second patient's dentition to account for the interproximal spaces between those teeth.

Also described herein are methods of segmenting a three-dimensional (3D) model of a patient's dentition (e.g., to identify individual teeth, gingiva, etc.), the method comprising: receiving, in a computing device, the 3D model of the patient's dentition; converting the 3D model of the patient's dentition into a sparse voxel representation comprising voxels having features mapped from the 3D model of the patient's dentition; and convolving the sparse voxel representation to segment the 3D model of the patient's dentition using a convolutional neural network to form a segmented 3D model of the patient's dentition.

Convolving the sparse voxel representation may further comprise applying a trained machine learning model to recognize segmentation elements corresponding to segmentation of the patient's dentition.

Features may be computed for each voxel based on a mesh representation of the 3D model of the patient's dentition. For example, features may be computed for each voxel based on one or more of: a sum of normals of mesh faces which map to the voxel, a count of faces mapped to the voxel, a sum of an area from the mesh representation, and an average of angles from the mesh representation.

In any of these methods, convolving comprises using sparse 3D submanifold convolution. Convolving the sparse voxel representation to segment the 3D model may comprise generating a predicted segmentation from the sparse voxel representation and applying (e.g., painting) the predicted segmentation onto the 3D model of the patient's dentition to form the segmented 3D model of the patient's dentition. Any of these methods may include assigning tooth number to individually segmented teeth of the segmented 3D model of the patient's dentition. Any of these methods may include postprocessing of the segmented 3D model of the patient's dentition to correct a tooth numbering.

Any of these methods may include capturing a scan of the patient's dentition with a scanning device (e.g., intraoral scanner) and converting the scan into the 3D model of the patient's dentition.

Further, any of the methods described herein may include outputting one or more of: interproximal contact distances, teeth numbers and sizes based on the segmented 3D model of the patient's dentition.

The methods described herein are typically computer-implemented methods. Also described herein are systems configured to perform any of these methods. For example, system may include one or more processors and a memory coupled to the one or more processors in which the memory is configured to store computer-program instructions, that, when executed by the one or more processors, perform a computer-implemented method.

For example, a system as descried herein may include: one or more processors and a memory coupled to the one or more processors in which the memory is configured to store computer-program instructions, that, when executed by the one or more processors, perform a computer-implemented method comprising receiving, in a computing device, the 3D model of the patient's dentition; converting the 3D model of the patient's dentition into a sparse voxel representation comprising voxels having features mapped from the 3D model of the patient's dentition; and convolving the sparse voxel representation to segment the 3D model of the patient's dentition using a convolutional neural network to form a segmented 3D model of the patient's dentition.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative examples, in which the principles of the invention are utilized, and the accompanying drawings of which:

DETAILED DESCRIPTION

Figure 1A:
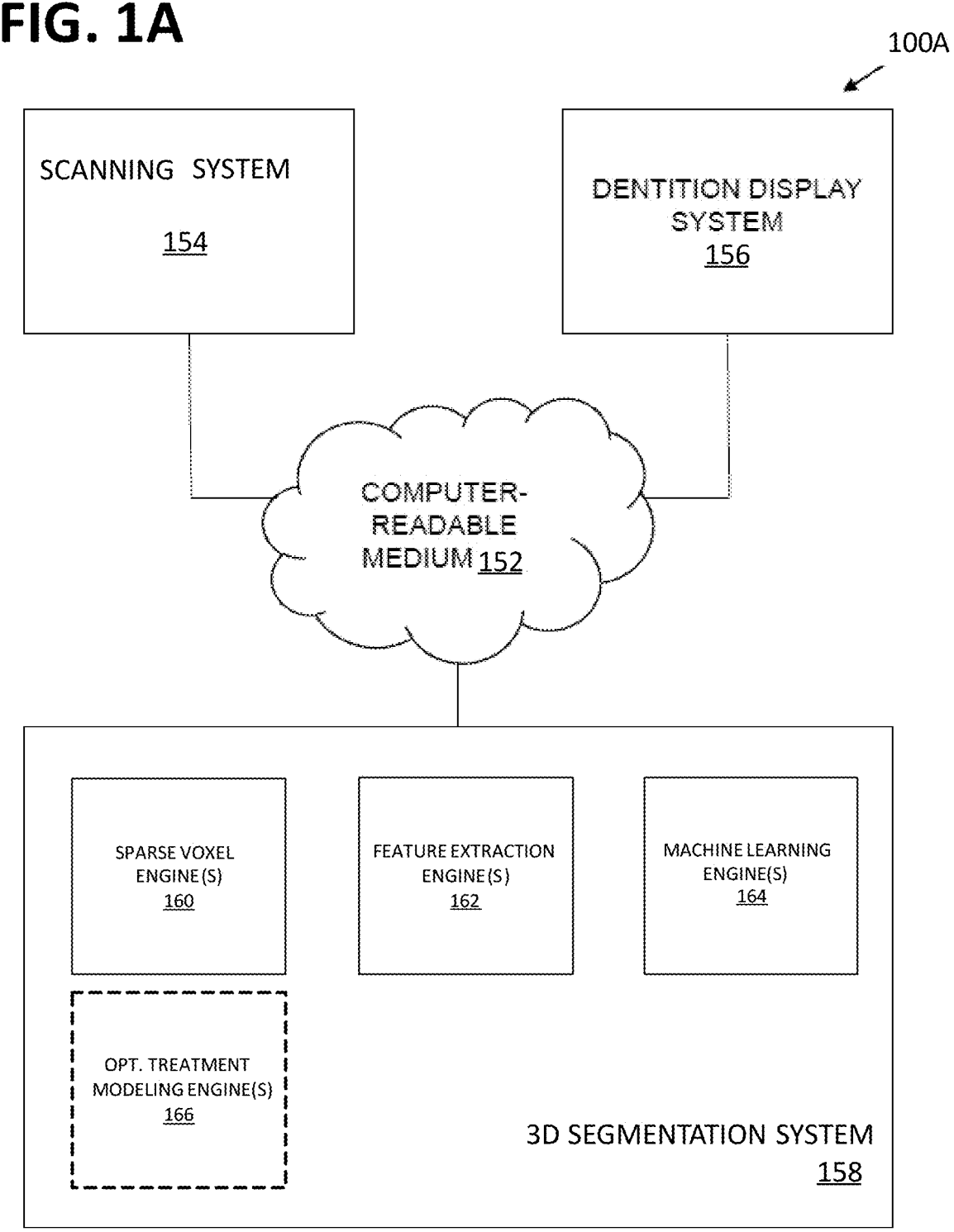
FIG. 1A is a diagram showing an example of a computing environment configured to digitally scan a dental arch and determine a post-treatment tooth position score.

Described herein are apparatuses (e.g., systems, computing device readable media, devices, etc.) and methods for training a machine learning model to recognize "segmentation elements" corresponding to segmentation of patient's dentition. One object of the present disclosure is to use machine learning technology to provide an automatic segmentation system that can segment a 3D model of a patient's detention into individual teeth and dental features. The machine learning model can make this determination based upon data including patient demographics, tooth measurements, tooth surface mesh, processed tooth features, and historical patient data. These methods and apparatus can use this information to train a machine learning model and use the machine learning model to segment the patient's detention.

For example, described herein are apparatuses and/or methods, e.g., systems, including systems to automatically implement processes that incorporate a tooth segmentation system. When the system is triggered by a request for dental segmentation, the system can retrieve relevant tooth/patient information from a local or remote database, convert the information into a sparse voxel representation, and compute features for each voxel based on mesh features mapped onto that voxel. In some examples, a voxel could have a feature of "1", i.e., there is a voxel here. More complicated features can be computed based on properties of the mesh. For example, the features can be the sum of the normals of the mesh faces which map to the voxel, the count of faces mapped to the voxel, the sum of the area, the average of the angles, etc. The computed features can then be passed into the machine learning model, which may use machine learning technology (e.g., Convolutional Neural Network (CNN), Decision Tree, Random Forest, Logistic Regression, Support Vector Machine, AdaBOOST, K-Nearest Neighbor (KNN), Quadratic Discriminant Analysis, Neural Network, etc.) to return a segmented model of the patient's detention. The parameters inputted into the machine learning model can be optimized with historic data. The results may be provided on demand and/or may be stored in a memory (e.g., database) for later use.

The apparatuses and/or methods described herein may be useful in planning and fabrication of dental appliances, including elastic polymeric positioning appliances, is described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., Santa Clara, Calif., under the tradename, Invisalign System.

Throughout the body of the description, the use of the terms "orthodontic aligner", "aligner", or "dental aligner" is synonymous with the use of the terms "appliance" and "dental appliance" in terms of dental applications. For purposes of clarity, examples are hereinafter described within the context of the use and application of appliances, and more specifically "dental appliances."

A "patient," as used herein, may be any subject (e.g., human, non-human, adult, child, etc.) and may be alternatively and equivalently referred to herein as a "patient" or a "subject." A "patient," as used herein, may but need not be a medical patient. A "patient," as used herein, may include a person who receives orthodontic treatment, including orthodontic treatment with a series of orthodontic aligners.

The apparatuses and/or methods (e.g., systems, devices, etc.) described below can be used with and/or integrated into an orthodontic treatment plan. The apparatuses and/or methods described herein may be used to segment a patient's teeth from a three-dimensional model, such as a 3D mesh model or a 3D point cloud, and this segmentation information may be used to simulate, modify and/or choose between various orthodontic treatment plans. Segmenting the patient's teeth can be done automatically (e.g., using a computing device). For example, segmentation can be performed by a computing system automatically by evaluating data (such as three-dimensional scan, or a dental impression) of the patient's teeth or arch.

As described herein, an intraoral scanner may image a patient's dental arch and generate a virtual three-dimensional model of that dental arch. During an intraoral scan procedure (also referred to as a scan session), a user (e.g., a dental practitioner) of an intraoral scanner may generate multiple different images (also referred to as scans or medical images) of a dental site, model of a dental site, or other object. The images may be discrete images (e.g., point-and-shoot images) or frames from a video (e.g., a continuous scan). The three-dimensional scan can generate a 3D mesh model, or a 3D point cloud model representing the patient's arch, including the patient's teeth and gums. Further computer processing as described herein can segment or separate the 3D mesh or 3D point cloud into individual teeth and gums.

An automated tooth segmentation system, as used herein, may include a system that uses automated agents to identify and/or number individual teeth and/or dental features of virtual representations of teeth, such as teeth represented in a three-dimensional dental mesh model or 3D point cloud resulting from a digital scan. The present disclosure presents one or more novel processes for identifying and segmenting a patient's teeth during a segmentation process. Some implementations herein may solve technical problems related to optimizing and/or increasing the accuracy and efficiency of digital dental scanning technologies.

FIG. 1A is a diagram showing an example of a computing environment 100A configured to facilitate gathering and processing digital scans of a dental arch with teeth therein. The environment 100A includes a computer-readable medium 152, a scanning system 154, a dentition display system 156, and a 3D mesh processing system 158. One or more of the modules in the computing environment 100A may be coupled to one another or to modules not explicitly shown.

The computer-readable medium 152 and other computer readable media discussed herein are intended to represent a variety of potentially applicable technologies. For example, the computer-readable medium 152 can be used to form a network or part of a network. Where two components are co-located on a device, the computer-readable medium 152 can include a bus or other data conduit or plane. Where a first component is co-located on one device and a second component is located on a different device, the computer-readable medium 152 can include a wireless or wired back-end network or LAN. The computer-readable medium 152 can also encompass a relevant portion of a WAN or other network, if applicable.

The scanning system 154 may include a computer system configured to scan a patient's dental arch. A "dental arch," as used herein, may include at least a portion of a patient's dentition formed by the patient's maxillary and/or mandibular teeth, when viewed from an occlusal perspective. A dental arch may include one or more maxillary or mandibular teeth of a patient, such as all teeth on the maxilla or mandible or a patient. The scanning system 154 may include memory, one or more processors, and/or sensors to detect contours on a patient's dental arch. The scanning system 154 may be implemented as a camera, an intraoral scanner, an x-ray device, an infrared device, etc. In some implementations, the scanning system 154 is configured to produce 3D scans of the patient's dentition. In other implementations the scanning system 154 is configured to produce 2D scans or images of the patient's dentition. The scanning system 154 may include a system configured to provide a virtual representation of a physical mold of patient's dental arch. The scanning system 154 may be used as part of an orthodontic treatment plan. In some implementations, the scanning system 154 is configured to capture a patient's dental arch at a beginning stage, an intermediate stage, etc. of an orthodontic treatment plan. The scanning system 154 may be further configured to receive 2D or 3D scan data taken previously or by another system.

The dentition display system 156 may include a computer system configured to display at least a portion of a dentition of a patient. The dentition display system 154 may include memory, one or more processors, and a display device to display the patient's dentition. The dentition display system 156 may be implemented as part of a computer system, a display of a dedicated intraoral scanner, etc. In some implementations, the dentition display system 156 facilitates display of a patient's dentition using scans that are taken at an earlier date and/or at a remote location. It is noted the dentition display system 156 may facilitate display of scans taken contemporaneously and/or locally to it as well. As noted herein, the dentition display system 156 may be configured to display the intended or actual results of an orthodontic treatment plan applied to a dental arch scanned by the scanning system 154. The results may include 3D virtual representations of the dental arch, 2D images or renditions of the dental arch, etc.

The 3D segmentation system 158 may include a computer system, including memory and one or more processors, configured to process scan data from the scanning system 154. In some examples, the 2D or 3D scan data can be processed into a 3D model of the patient's teeth. The 3D segmentation system 158 may further be configured to convert the 3D model into a sparse voxel representation of the 3D model. In some implementations, the 3D segmentation system 158 may extract features for each voxel in the sparse voxel representation based on the 3D model features that were mapped to each voxel. The 3D segmentation system is also configured to input the sparse voxel representation into a machine learning model to train the machine learning model to identify "segmentation elements" corresponding to segmentation of a patient's detention. "Segmentation elements", as used herein, can refer to classes of features or structures within the 3D models that can be used to identify, label, and segment the 3D models into individual dental components, including individual teeth, interproximal spaces between teeth, and/or gingiva. The 3D segmentation system is further configured to use the trained machine learning model to automatically segment the 3D model into individual dental components, including segmenting the sparse voxel representation of the 3D model into individual teeth, interproximal spaces between teeth, and/or gingiva. The segmented 3D model can be used to create an implement a dental treatment plan for the patient. The 3D segmentation system 158 may include sparse voxel engine(s) 160, feature extraction engine(s) 162, machine learning engine(s) 164, and optional treatment modeling engine(s) 166. One or more of the modules of the 3D segmentation system 158 may be coupled to each other or to modules not shown.

The sparse voxel engine(s) 160 of the 3D segmentation system 158 may implement automated agents to process 2D or 3D scans taken by the scanning system 154 to produce 3D models of the patient's dentition. In some implementations, the sparse voxel engine(s) 160 formats scan data from a scan of a dental arch into a 3D dental model (e.g., a 3D dental mesh model or a 3D point cloud) of the dental arch. In other implementations, the sparse voxel engine(s) 160 directly receives a 2D or 3D dental model, and processes the received model into a 3D model of the appropriate format. In some implementations, the 3D segmentation system 158 may convert the 3D models into sparse voxel representations of the 3D model comprising voxels with unique voxel geometries that represent the patients' dentitions.

Figure 2A:
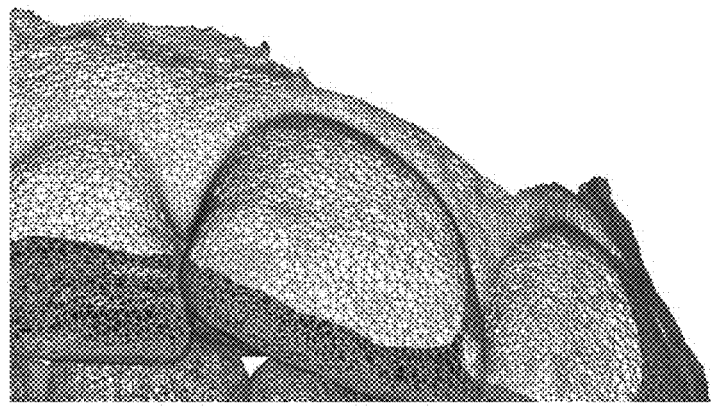
FIGS. 2A-2C shows examples types of 3D models that can be input into the computing engine(s) described above.
Figure 2B:
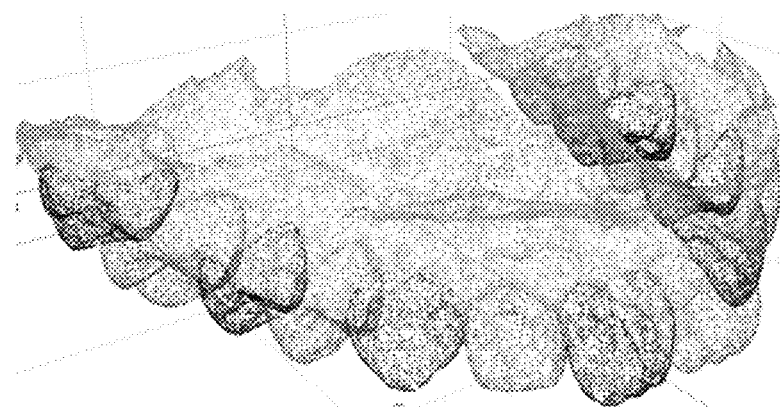
Figure 2C:

FIG. 2A represents one example of a 3D scan taken by scanning system 154 in which the output comprises a 3D mesh, FIG. 2B represents one example of a 3D scan taken by scanning system 154 in which the output comprises a 3D point cloud without normals, and FIG. 2C represents one example of a 3D scan taken by scanning system 154 in which the output comprises a 3D point cloud with normal.

The feature extraction engine(s) 162 of the 3D segmentation system 158 can implement automated agents to compute features for each voxel in the sparse voxel representation based on the 3D model features that were mapped to each voxel. As described above, the 3D model may comprise a 3D mesh or a 3D point cloud of the patient's teeth. In one implementation, a voxel could have a feature of "1", to indicate that a voxel is present. More complicated features can be computed by the feature extraction engine(s) 162 based on geometric properties of the 3D model that are mapped to each voxel in the sparse voxel representation. For example, in some implementations, the feature extraction engine(s) 162 can be configured to compute features for each voxel that comprise the sum of the normals of 3D mesh faces which map to the voxel, the count of 3D mesh faces mapped to the voxel, the sum of 3D mesh areas, the average of 3D mesh angles, etc. Additionally, the feature extraction engine(s) 162 can implement automated agents to normalize the computed features (e.g., subtracting the mean and dividing by the standard deviation). The computed or extracted features for each voxel in the sparse voxel representation can be used as an input to the machine learning engine(s) 164 of the 3D segmentation system 158.

The machine learning engine(s) 164 may implement automated agents to train a machine learning model with the sparse voxel representation, including the extracted features from feature extraction engine(s) 162, to recognize "segmentation elements" corresponding to segmentation of a patient's detention. As described above, "segmentation elements" can refer to classes of features or structures within the 3D models that can be used to identify, label, and segment the 3D models into individual dental components, including individual teeth, interproximal spaces between teeth, and/or gingiva. In some implementations, the machine learning engine(s) 164 is configured to use the input from the feature extraction engine(s) 162 to train a submanifold sparse convolutional network to recognize "segmentation elements". All the input features from the sparse voxel representation can contribute to machine learning model and are analogous to the Red, Green, and Blue color channels used in images. Other convolution techniques can be used in alternative implementations, including full convolution, or hybrid approaches in which a sparse convolutional network is used at high levels and a dense convolutional network is used when the size of the input has been reduced to an appropriate level.

The machine learning engine(s) 164 may use additional layers to extract face-wise prediction using face-wise features like surface normal, areas of faces, relative position and orientation in the voxel, etc. The machine learning engine(s) 164 can be configured to generalize complex high-level features by using a deep convolution network that comprises a plurality of convolution layers with small (e.g., 3×3) filters which are useful for spatial regularization. The machine learning engine(s) 164 can be further configured to extract low-level fine-grained features from the face-wise prediction.

In other implementations, a human technician's manual segmentation of scan data can be input as a ground truth into the machine learning model, and the machine learning model can be trained to achieve the ground truth as the output for a corresponding input. The machine learning models weights can be adjusted to minimize the error between the output and the ground truth as the machine learning model is trained.

The machine learning engine(s) 164 may be trained to construct a semantic segmentation network from the input to identify "segmentation elements" in which multiple objects of the same class are treated as a single entity. For example, all features linked to a segmentation element label of "teeth" can be identified as teeth, all features linked to a segmentation element label of "interproximal spaces", can be identified as interproximal spaces, and all features linked to a segmentation element label of "gingiva" can be identified as gingiva. Furthermore, the machine learning engine(s) 164 may be trained to construct an instance segmentation network to identify "segmentation elements" in which multiple objects of the same class are treated as distinct individual objects or instances. In one specific implementation, the image-based network, Mask RCNN comprises a region proposal network, an instance classifier, and an instance mask. This style of network can be implemented with a sparse voxel 3D representation that results in a network that accurately finds a 3D mask of each tooth and classifies each tooth. Alternatively, each instance proposal could be classified with a separate approach. In this implementation, the 3D model can be segmented using an instance segmentation combined with an instance classification.

Examples of machine learning systems that may be used include, but are not limited to, Convolutional Neural Networks (CNN) such as U-Net, ResNeXt, Xception, RefineNet, Kd-Net, SO Net, Point Net, or Point CNN, and additional machine learning systems such as Decision Tree, Random Forest, Logistic Regression, Support Vector Machine, AdaBoosT, K-Nearest Neighbor (KNN), Quadratic Discriminant Analysis, Neural Network, etc. Additionally, the variations of the CNNs described above can be implanted. For example, a CNN such as Unet can be modified to use alternative convolutional blocks (e.g., ResNeXt or Xception) instead of the VGG-style blocks that are implemented by default.

The machine learning engine(s) 164, including the trained machine learning model, may also be configured to automatically segment the 3D model or the sparse voxel representation of the 3D model into individual dental components, including segmenting into individual teeth, interproximal spaces between teeth, and/or gingiva. The segmentation results may comprise data points in 3D space that depict teeth and/or other elements or features of the dental arch in a format that can be rendered on the dentition display system 156. For example, individual teeth may be identified and numbered. Additional dental features, such as gingiva and the interproximal spaces between teeth may also be identified and labeled. In some implementations, the machine learning engine(s) 164 can be used to automatically segment the 3D model while the machine learning model is being trained. In other implementations, the machine learning engine(s) can simply input a 3D model into an already trained machine learning model to provide a segmentation output. In addition to individual segmentation determinations, the machine learning engine(s) 164 can produce an output that includes a score or probability that indicates the accuracy of the segmentation output.

In some implementations, the machine learning engine(s) 164 may implement automated agents to apply algorithmic postprocessing to the output of the trained machine learning model to improve the predicted segmentation score or probability of accuracy. For example, some segmentation outputs can include segmentation solutions in which one or more teeth numbers may be assigned to a particular region or subset of data in the 3D model. An algorithmic postprocessing approach can sum the probabilities of individual teeth being assigned to the particular region to identify the segmentation output with the highest probability of being accurate.

The optional treatment modeling engine(s) 166 may be configured to use the segmented 3D model to store and/or provide instructions to implement orthodontic treatment plans and/or the results of orthodontic treatment plans. The optional treatment modeling engine(s) 166 may provide the results of orthodontic treatment plans on a 3D model. In some examples, the 3D model can be rendered into one or more 2D image(s) from a plurality of viewing angles. The optional treatment modeling engine(s) 166 may model the results of application of orthodontic aligners to the patient's dental arch over the course of an orthodontic treatment plan.

As used herein, any "engine" may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some examples, the cloud-based engines can execute functionalities and/or modules that end users access through a web browser or container application without having the functionalities and/or modules installed locally on the end-users' computing devices.

As used herein, "datastores" may include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

Figure 1B:
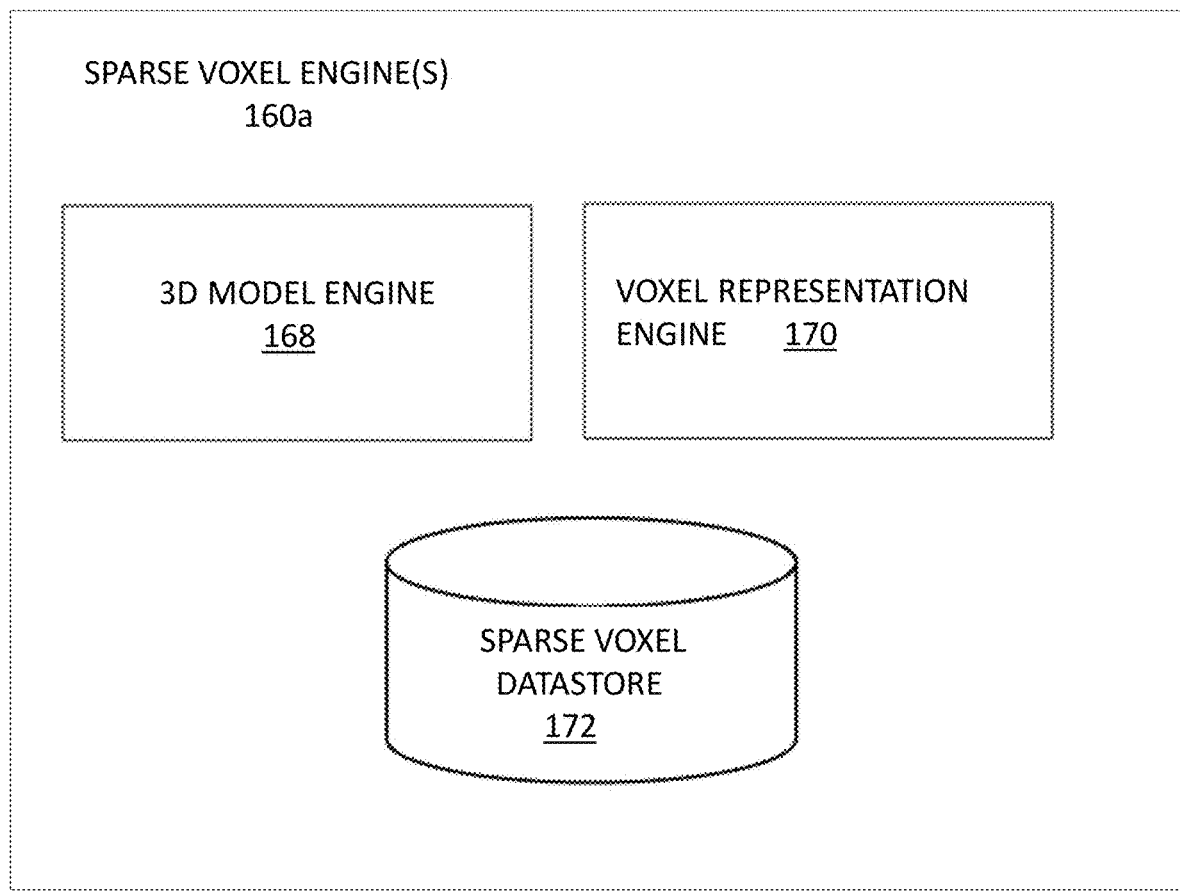
FIG. 1B is a diagram showing an example of sparse voxel engine(s).

FIG. 1B is a diagram showing an example of the sparse voxel engine(s) 160*a*. The sparse voxel engine(s) 160*a* may include a 3D model engine 168, a voxel representation engine 170, and a sparse voxel datastore 172. One or more of the modules of the segmentation engine(s) 160*a* may be coupled to each other or to modules not shown.

The 3D model engine 168 may implement one or more automated agents configured to format 2D or 3D scan data from a scan of a dental arch into a 3D model (e.g., a 3D dental mesh model, a 3D point cloud, etc.) of the dental arch. The 3D model of the dental arch may comprise geometric point clouds or polyhedral objects that depict teeth and/or other elements of the dental arch in a format that can be rendered on the dentition display system 156. The 3D model engine 168 may provide 3D models and/or other data to the voxel representation engine 170 and the sparse voxel datastore 172.

The voxel representation engine 170 may implement automated agents to convert the 3D models into sparse voxel representations of the 3D model comprising voxels with unique voxel geometries that represent the patients' dentitions. The sparse voxel representation considers a voxel in every location with a vertex in the original 3D model. For each voxel, this can be represented in 3D space as (x, y, z, D) where D is some data. The data D can be features computed and/or extracted by the feature extraction engine(s) 162*a*, described below. In one implementation, each voxel can be represented in 3D space as (x, y, z, N, C), where N is the normal vector and C is the color of associated with the voxel from the 2D or 3D scan data.

The sparse voxel datastore 172 may be configured to store data related to the 3D model and the sparse voxel representations of the 3D model from the modules described above.

Figure 1C:
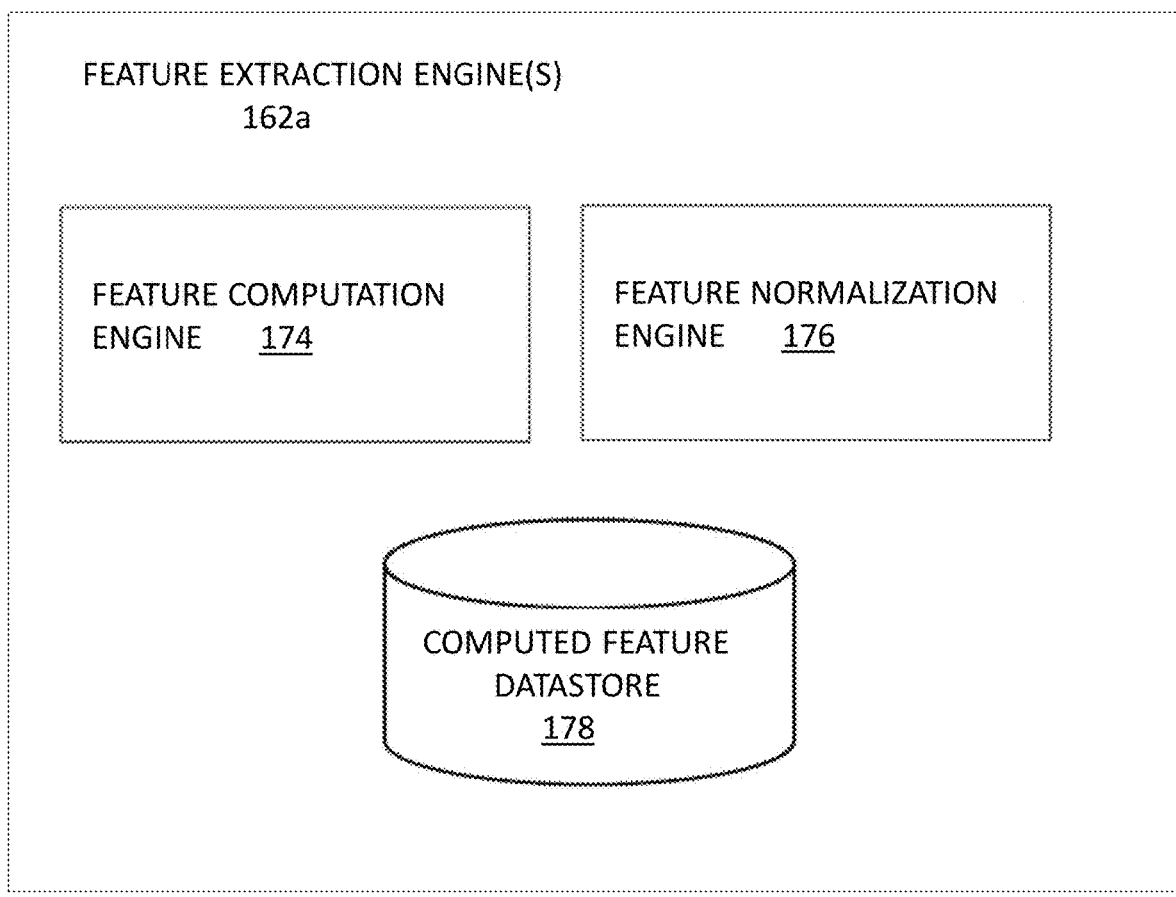
FIG. 1C is a diagram showing an example of feature extraction engine(s).

FIG. 1C is a diagram showing an example of a feature extraction engine(s) 162*a*. The feature extraction engine(s) 162*a* may include feature computation engine 174, feature normalization engine 176, and computed feature datastore 178. One or more of the modules of the feature extraction engine(s) 162*a* may be coupled to each other or to modules not shown.

The feature computation engine 174 may implement one or more automated agents configured to compute or extract features for each voxel in the sparse voxel representation based on 3D model features that were mapped to each voxel. As described above, the original 3D model may comprise a 3D mesh and/or a 3D point cloud of the patient's teeth. In one implementation, the feature extraction engine 174 can extract feature of "1", to indicate that a voxel is present, and a feature of "0" to indicate that a voxel is not present. More complicated features can be computed by the feature computation engine based on geometric properties of the 3D model that are mapped to each voxel in the sparse voxel representation. For example, in some implementations, the feature computation engine can be configured to compute features for each voxel that comprise the sum of the normals of 3D mesh faces which map to the voxel, the count of 3D mesh faces mapped to the voxel, the sum of 3D mesh areas, the average of 3D mesh angles, etc. In another example, the feature computation engine can identify vertices in the 3D model, iterate through the vertices, and for each vertex, add a tuple of (x, y, z, D). The computed features can be represented in 3D space as (x, y, z, D) where D is some data corresponding to the computed feature.

The feature normalization engine 176 may implement one or more automated agents configured to normalize the computed features from the feature computation engine. In one implementation, the feature normalization engine can be configured to normalize the features by subtracting the mean and dividing by the standard deviation. Feature normalization is used to ensure that features input into the machine learning model contribute approximately proportionally to the final output.

The computed feature datastore 178 may be configured to store data related to the sparse voxel representation, computed and extracted features, and normalized features from the modules described above.

Figure 1D:
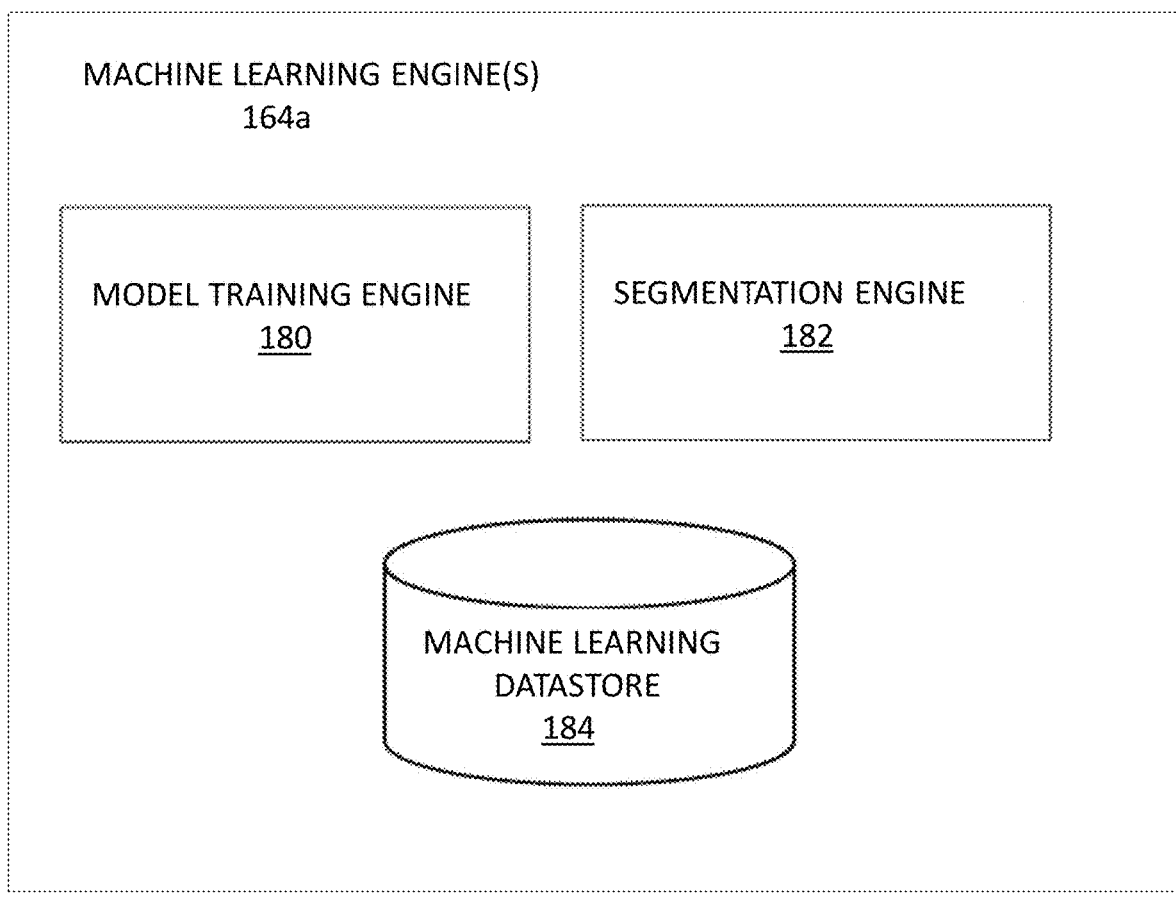
FIG. 1D is a diagram showing an example of a machine learning engine(s).

FIG. 1D is a diagram showing an example of the machine learning engine(s) 164*a*. The machine learning engine(s) 164*a* may acquire 2D or 3D scan data, 3D model data, sparse representations of the 3D model data, computed and extracted features, and normalized features from the sparse voxel engine(s) and feature extraction engine(s) described above. The machine learning engine(s) 164*a* may include a model training engine 180, a segmentation engine 182, and a machine learning datastore 184.

The model training engine 180 may implement one or more automated agents configured to use machine learning techniques to train a machine learning model to recognize "segmentation elements" in an input comprising a 3D model or a sparse representation of the 3D model. In some implementations, the model training engine 180 may train the machine learning model with a plurality of 2D or 3D scan data, 3D model data, sparse representations of the 3D model data, computed and extracted features, and/or normalized features. Multiple training cases comprising 3D models and extracted features from various patients can be used to train the model. In some implementations, the model training engine 180 is configured to use these inputs to train a submanifold sparse convolutional network to recognize "segmentation elements". However, other convolution techniques can be used in alternative implementations, including full convolution, or hybrid approaches in which a sparse convolutional network is used at high levels and a dense convolutional network is used when the size of the input has been reduced to an appropriate level. The model training engine 180 may be trained to construct a semantic segmentation network from the input to identify "segmentation elements" in which multiple objects of the same class are treated as a single entity. Furthermore, the model training engine 180 may be trained to construct an instance segmentation network to identify "segmentation elements" in which multiple objects of the same class are treated as distinct individual objects or instances.

In one implementation of training the machine learning model, a technician can evaluate 2D or 3D scan data, or a 3D model of patients' dentitions, and manually identify "segmentation elements" in the data. For example, the technician can identify individual teeth, gingiva, and/or interproximal spaces between teeth. The technician can individually label and/or number each tooth and the gingiva. For example, the technician can label the individual teeth (e.g., assign numbers 1-16 for the different types of teeth) and apply a separate label (e.g., the number 17) for the gingiva. The technician's evaluation can then be input into the machine learning model as the "ground truth", which is the desired output of the machine learning model for a given input. Therefore, the machine learning model can be trained to achieve the technician's evaluation as an output for a given 2D or 3D model input. The weights of the machine learning model can be adjusted to minimize the error between the ground truth and the output of the model. This technique can be used to train the machine learning model to identify individual teeth, including identifying the type of teeth, and also to identify the gingiva and/or interproximal spaces between teeth.

Examples of machine learning systems that may be used by the model training engine include, but are not limited to, Convolutional Neural Networks (CNN) such as U-Net, ResNeXt, Xception, RefineNet, Kd-Net, SO Net, Point Net, or Point CNN, and additional machine learning systems such as Decision Tree, Random Forest, Logistic Regression, Support Vector Machine, AdaBoosT, K-Nearest Neighbor (KNN), Quadratic Discriminant Analysis, Neural Network, etc. Additionally, the variations of the CNNs described above can be implanted. For example, a CNN such as Unet can be modified to use alternative convolutional blocks (e.g., ResNeXt or Xception) instead of the VGG-style blocks that are implemented by default.

The segmentation engine 182 may implement one or more automated agents configured to use the trained machine learning model to automatically segment the 3D model into individual dental components, including segmenting the sparse voxel representation of the 3D model into individual teeth, interproximal spaces between teeth, and/or gingiva. In some implementations, the segmentation engine 182 can be configured to adjust the size and/or shape of individual teeth in the 3D model to imitate the predicted interproximal spaces between those teeth.

The segmentation results may comprise data points in 3D space that depict teeth and/or other elements or features of the dental arch. For example, individual teeth may be identified and numbered. Additional dental features, such as gingiva and the interproximal spaces between teeth may also be identified and labeled. In some implementations, the segmentation output can include a score or a probability that the output is accurate.

If semantic segmentation is implemented in the machine learning model, the segmentation engine 182 may provide an output that identifies dental objects of the same class (e.g., teeth, gingiva, interproximal spaces) as a single entity. For example, all teeth, interproximal spaces, and gingiva can be grouped and identified as such. Alternatively, if instance segmentation is implemented in the machine learning model, the segmentation engine 182 may provide an output that identifies multiple dental objects of the same class (e.g., teeth, gingiva, interproximal spaces) as distinct individual objects or instances. The distinct individual objects can be, for example, individually numbered or labeled in the output. The output from the segmentation engine may be used to automatically and accurately label the individual teeth of the 3D model, e.g., by numbering the teeth in a standard tooth numbering. In some implementations, the 3D model itself, or the sparse representation of the 3D model can be updated to incorporate the output of the segmentation engine, including numbering the individual teeth and/or labeling the gingiva or interproximal spaces between teeth.

In some implementations, the segmentation engine 182 may be further configured to apply algorithmic postprocessing to the segmentation output to improve the segmentation of the 3D model. Additional algorithmic processing can be applied to the vertices of the original 3D model, or to the sparse representation of the 3D model to further improve the segmentation output. For example, the segmentation scores or probabilities can be used to determine the best segmentation result in the event that multiple "segmentation elements" are predicted for a given subset of the 3D model.

The machine learning datastore 184 may be configured to store data related to the output of the machine learning engine(s), including the "segmentation elements", or the segmented output of the 3D model or the sparse representation of the 3D model, or a segmentation score or probability from the modules described above.

Figure 3A:
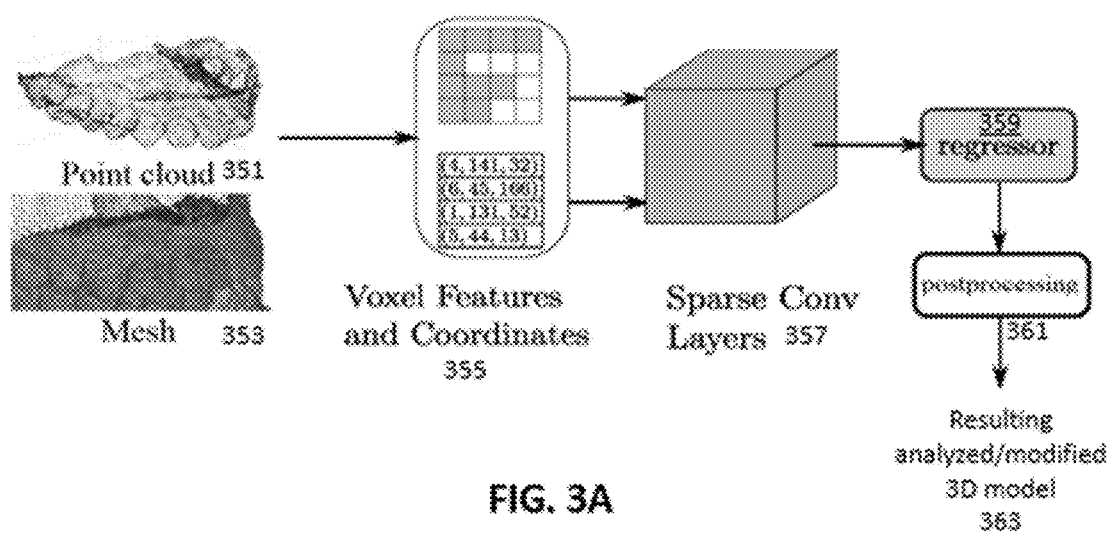
FIG. 3A illustrates one example of a method of determining properties (e.g., segmenting, determining interproximal spacing, determining tooth number, etc.) a 3D model of a patient's dentition.
Figure 3B:
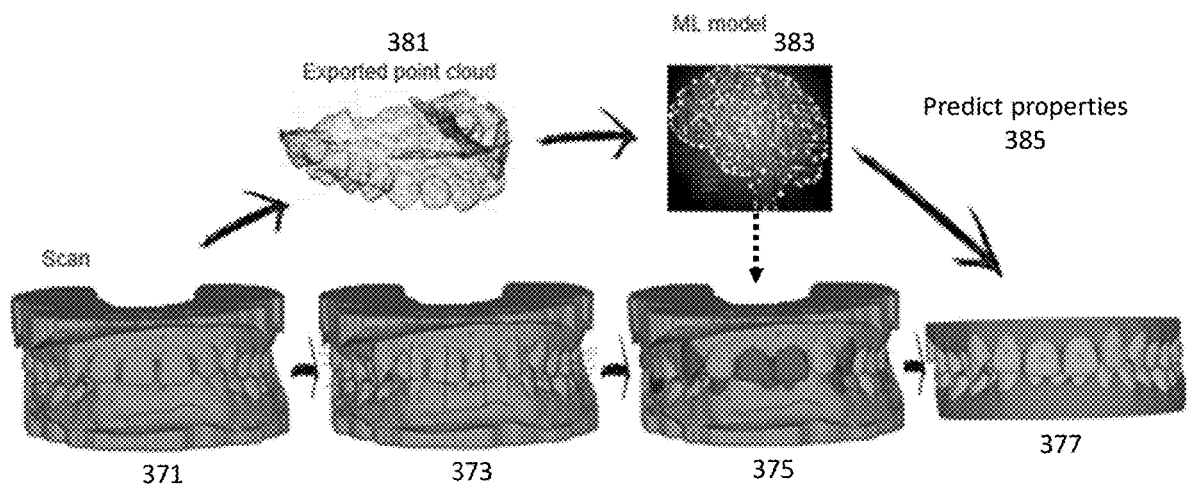
FIG. 3B illustrates another example of a method of determining properties (e.g., segmenting, determining interproximal spacing, determining tooth number, etc.) a 3D model of a patient's dentition.

FIGS. 3A and 3B illustrate examples of methods of determining properties (e.g., segmenting, determining interproximal spacing, determining tooth number, etc.) a 3D model of a patient's dentition. In FIG. 3A, the system or method may include receiving a 3D model of a patient's dentition. The 3D model may be (or may be converted into) a point cloud 351 and/or a mesh 353 model of the patient's dentition (e.g., teeth, gingiva, palate, etc.). The system or method may then generate voxel features and coordinates 355 which may be formed directly as or converted int a sparse voxel representation. The sparse voxel representation may then be convolved (sparse cony layers 357) and a regressor 359 used with a trained machine learning agent to recognize/identify properties, such as segmentation (and/or tooth spacing, tooth numbering, etc.) of the patient's dentition and form a modified 3D model 363, such as a segmented 3D model. This analysis may be postprocessed 361 as described herein to refine the modified 3D model.

FIG. 3B illustrates another example of a method of determining properties (e.g., segmenting, determining interproximal spacing, determining tooth number, etc.) of a 3D model of a patient's dentition showing a method using a machine learning agent using a sparse voxel representation (top) in comparison with a method that does not use a machine learning agent using a sparse voxel representation (bottom).

In FIG. 3B, and initial scan is provided as input 371. When a machine learning agent is not used, the initial matching of generic teeth 373 may be made. During this process the teeth may be roughly matched to their places, initial numbering happens, axes are taken from generic shapes. This results in a facial axis of the clinical crown (FACC) line being determined for each tooth. At a second stage 375, the FACC lines are considered to be a source for painting each tooth (e.g., marking segmented teeth). The tooth is painted starting from FACC and going to both direction. Finally the more correct axes setting may be done after generic tooth shape imitation to the painting.

By comparison, the methods described herein using a machine learning agent with a sparse voxel representation of the dentition, the scan (which may be exported as/converted to a point cloud 381 and/or a mesh) may be analyzed by the trained machine learning agent 383 as described herein. This method may remove the manual painting step 373 and instead may use the segmentation ("painting") predicted by the neural network instead. The machine learning agent may be used to predict properties 385. For example, the predicted segmentation is instead applied to the 3D model of the teeth (e.g., from the scan); alternatively the machine learning agent may determine tooth numbering 377 and/or interproximal spacing and output this as a list or a labeled 3D model. This is schematically illustrated in FIG. 3B.

Figure 4:
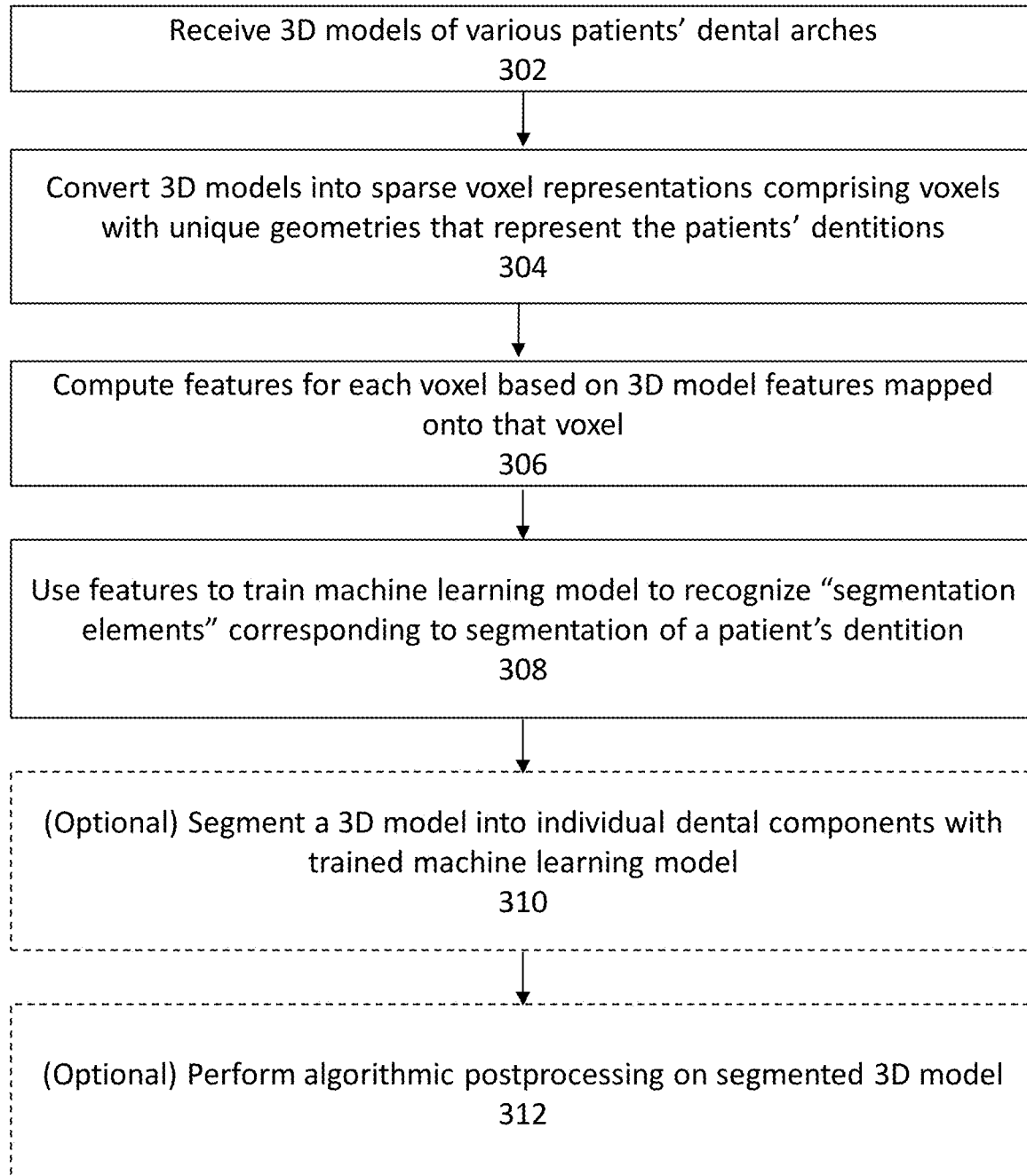
FIG. 4 is a flowchart describing one example of training a machine learning model to segment a 3D model of a patient's teeth.

FIG. 4 illustrates one example of a method for training a machine learning model to segment a 3D model of a patient's teeth. This method may be automatically implemented by a system, such as one or more of the systems in the computing environment 100A, shown in FIG. 1A. At an operation 302, the system may automatically receive three-dimensional (3D) models of various patients' dental arches. The models may be generated from a scan collected directly from the patients (e.g., using an intraoral scanner) or indirectly (e.g., by scanning a mold of the patients' dentition and/or by receiving digital models of the patients taken by another, etc.). The 3D models of the patients' teeth can comprise, for example, a 3D mesh model and/or a 3D point cloud. Although only a single data set is required to train the model, multiple training cases can improve the model training and increase the accuracy of the machine learning model in identifying "segmentation elements".

At an operation 304, the system may automatically convert the 3D models into sparse voxel representations of the 3D model comprising voxels with unique geometries that represent the patients' dentitions. The sparse voxel representation of the 3D model can consider a voxel in every location with a vertex in the original 3D model. For each voxel, this may be represented in 3D space as (x, y, z, D), where D is some data representing a feature of the voxel. In one implementation, each voxel can be represented in 3D space as (x, y, z, N, C), where N is the normal vector and C is the color of associated with the voxel from the 2D or 3D scan data.

At an operation 306, the system may automatically extract or compute features for each voxel from the sparse voxel representation of the 3D model of the patient's teeth based on 3D model features converted or mapped onto that voxel. The system can extract a feature of "1", to indicate that a voxel is present, and a feature of "0" to indicate that a voxel is not present. More complicated features can be computed by the system based on geometric properties of the 3D model that are mapped to each voxel in the sparse voxel representation. For example, in some implementations, the system can be configured to compute features for each voxel that comprise the sum of the normals of 3D mesh faces which map to the voxel, the count of 3D mesh faces mapped to the voxel, the sum of 3D mesh areas, the average of 3D mesh angles, etc. In another example, the feature computation engine can identify vertices in the 3D model, iterate through the vertices, and for each vertex, add a tuple of (x, y, z, D). The computed features can be represented in 3D space as (x, y, z, D), where D is some data corresponding to the computed feature.

At an operation 308, the system may use the computed features to train a machine learning model to recognize "segmentation elements" corresponding to segmentation of a patient's dentition. As described above, "segmentation elements" can refer to classes of features or structures within the 3D models that can be used to identify, label, and segment the 3D models into individual dental components, including individual teeth, interproximal spaces between teeth, and/or gingiva. Multiple training cases comprising computed features can be input into the machine learning model to further train the model. In some examples, the inputs are used to train a submanifold sparse convolutional neural network to recognize "segmentation elements". In other examples, other convolution techniques can be used, including dense convolutional networks and hybrid approaches in which a sparse convolutional network is used at high levels and a dense convolutional network is used when the size of the input is reduced. In some examples, the machine learning model is trained to construct a semantic segmentation network. In other examples, the machine learning model is trained to construct an instance segmentation network.

At an optional operation 310, the system can use the trained machine learning model from operation 308 to segment a 3D model input into individual dental components. For example, a 3D model or a sparse voxel representation of a 3D model can be input into the trained machine learning model to produce a segmentation output that identifies and/or labels individual dental components of the 3D model, including identifying and/or labeling individual teeth, gingiva, and interproximal spaces between teeth.

At an optional operation 312, the system can further perform algorithmic postprocessing to the segmentation output from operation 310 to improve the segmentation of the 3D model. Additional algorithmic processing can be applied to the vertices of the original 3D model, or to the sparse representation of the 3D model to further improve the segmentation output. For example, the segmentation scores or probabilities can be used to determine the best segmentation result in the event that multiple "segmentation elements" are predicted for a given subset of the 3D model.

Figure 5:
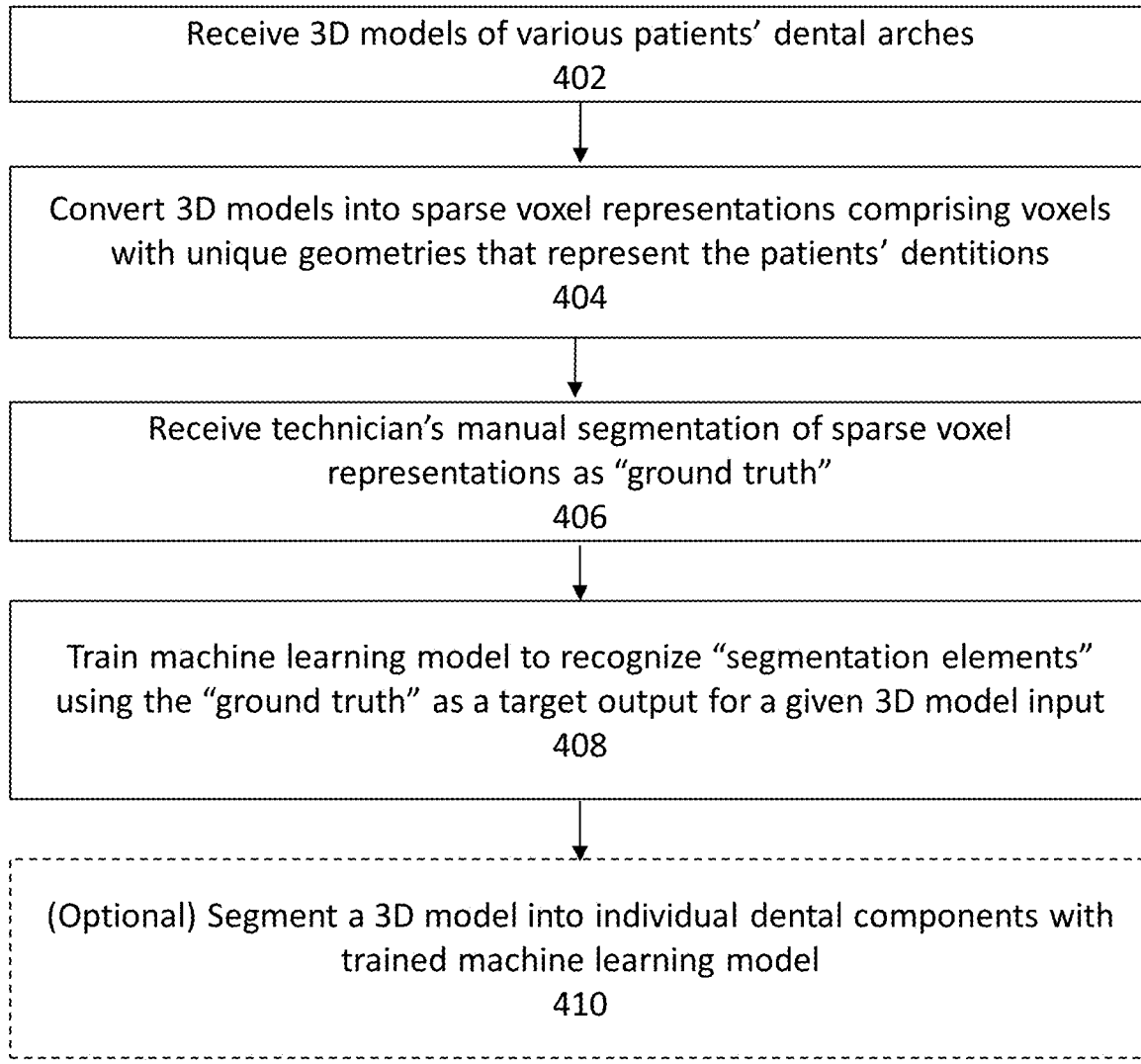
FIG. 5 is a flowchart describing another example of training a machine learning model to segment a 3D model of a patient's teeth.

FIG. 5 illustrates one example of a method for training a machine learning model to segment a 3D model of a patient's teeth with a technician's manual segmentation as a "ground truth" input. This method may be automatically implemented by a system, such as one or more of the systems in the computing environment 100A, shown in FIG. 1A. At an operation 402, the system may automatically receive three-dimensional (3D) models of various patients' dental arches. The models may be generated from a scan collected directly from the patients (e.g., using an intraoral scanner) or indirectly (e.g., by scanning a mold of the patients' dentition and/or by receiving digital models of the patients taken by another, etc.). The 3D models of the patients' teeth can comprise, for example, a 3D mesh model or a 3D point cloud. Although only a single data set is required to train the model, multiple training cases can improve the model training and increase the accuracy of the machine learning model in identifying "segmentation elements".

At an operation 404, the system may automatically convert the 3D models into sparse voxel representations of the 3D model comprising voxels with unique geometries that represent the patients' dentitions. The sparse voxel representation of the 3D model can consider a voxel in every location with a vertex in the original 3D model. For each voxel, this may be represented in 3D space as (x, y, z, N, C), where N is the normal vector and C is the color of associated with the voxel from the 3D model.

At an operation 406, the system may receive a technician's manual segmentation of the sparse voxel representation of the 3D model. The manual segmentation can comprise an evaluation by a technician of 2D or 3D scan data, or a 3D model of patients' dentitions, that includes identification of "segmentation elements" in the data, including individual teeth, gingiva, and/or interproximal spaces between teeth. The manual segmentation can further comprise labels for the individual teeth (e.g., assigned numbers 1-16 for the different types of teeth) and a separate label (e.g., the number 17) for the gingiva.

At an operation 408, the system may use the "ground truth" (e.g., the technician's manual segmentation of the 3D model) to train a machine learning model to recognize "segmentation elements" corresponding to segmentation of a patient's dentition. As described above, "segmentation elements" can refer to classes of features or structures within the 3D models that can be used to identify, label, and segment the 3D models into individual dental components, including individual teeth, interproximal spaces between teeth, and/or gingiva. Multiple training cases comprising a "ground truth" can be input into the machine learning model to further train the model. In some examples, the weights of the machine learning model can be adjusted while training to minimize the error between the ground truth and the output of the model.

At an optional operation 410, the system can use the trained machine learning model from operation 408 to segment a 3D model input into individual dental components. For example, a 3D model or a sparse voxel representation of a 3D model can be input into the trained machine learning model to produce a segmentation output that identifies and/or labels individual dental components of the 3D model, including identifying and/or labeling individual teeth, gingiva, and interproximal spaces between teeth. In some implementations, the size and/or shape of individual teeth in the 3D model can be adjusted to account for the predicted interproximal spaces between those teeth.

Figure 6A:
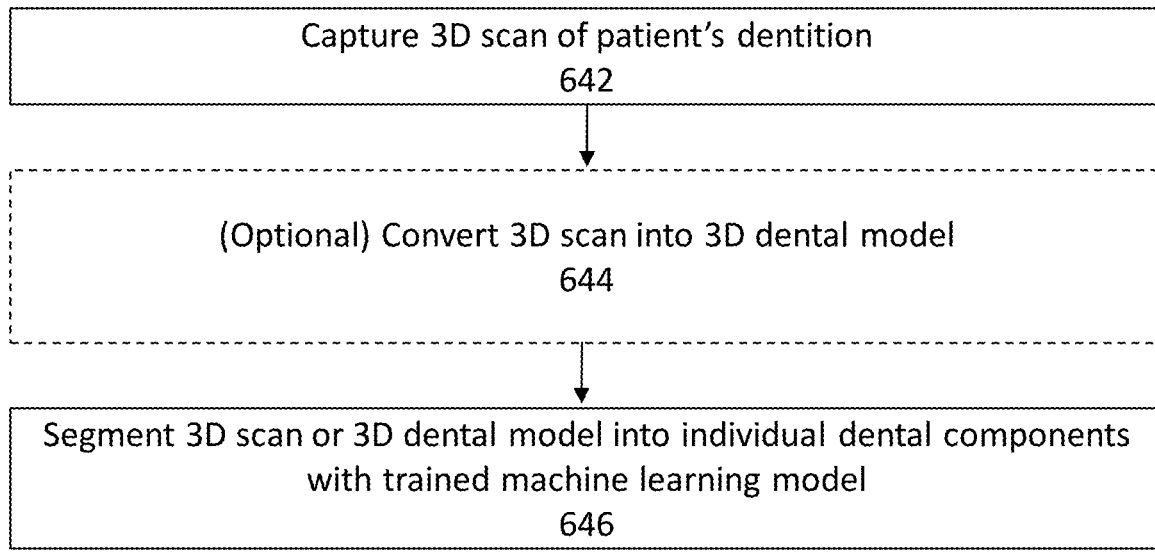
FIG. 6A schematically illustrates one example of a method of segmenting a 3D scan or 3D model of a patient's teeth into individual dental components.

FIG. 6A is a flowchart that illustrates one example of a method of segmenting a 3D scan or 3D model of a patient's dentition (e.g., teeth) into individual dental components. The method of FIG. 6A is similar to the methods described above with respect to FIGS. 3 and 4, except the method of FIG. 6A applied the trained machine learning model, such as those described in FIGS. 4 and 5. This method may be automatically implemented by a system, such as one or more of the systems in the computing environment 100A, shown in FIG. 1A. At an operation 642, the system may capture three-dimensional (3D) scans of a patient's dental arch. The 3D scan may be generated from a [scan collected directly from the patients (e.g., using an intraoral scanner) or indirectly (e.g., by scanning a mold of the patients' dentition and/or by receiving digital models of the patients taken by another, etc.).

At an optional operation 644, the system can convert the 3D scan into a 3D dental model. The 3D dental model can comprise, for example, a 3D mesh model or a 3D point cloud. In some implementations, the 3D model can comprise a sparse voxel representation of a 3D mesh model or a 3D point cloud.

At an operation 646, the system can use a trained machine learning model to segment a 3D model input into individual dental components. For example, a 3D scan, a 3D model, or a sparse voxel representation of a 3D model can be input into the trained machine learning model to produce a segmentation output that identifies and/or labels individual dental components of the 3D model, including identifying and/or labeling individual teeth, gingiva, and interproximal spaces between teeth.

Figure 7:
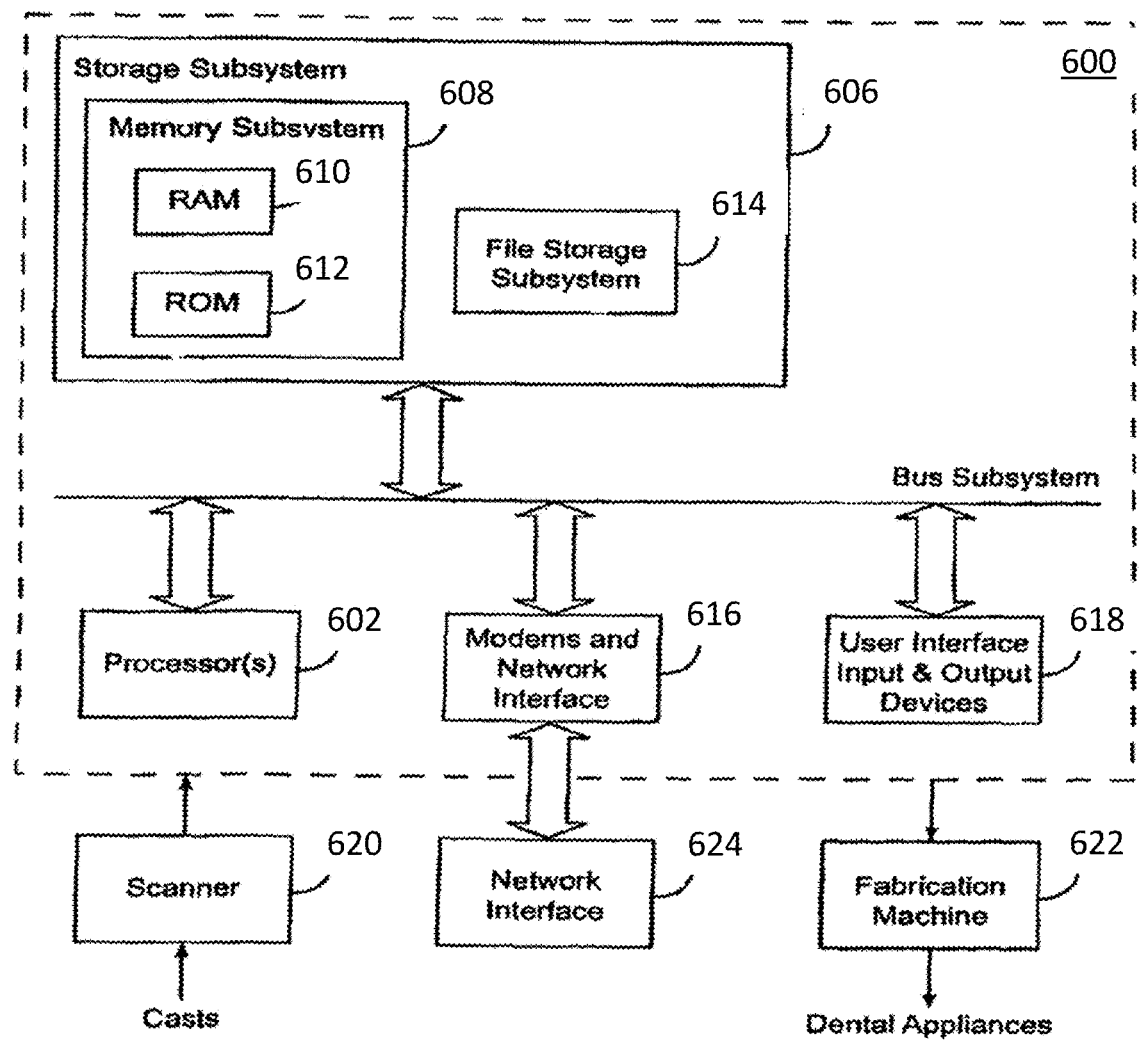
FIG. 7 is a simplified block diagram of a data processing system that may perform the methods described herein.

The methods described herein may be performed by an apparatus, such as a data processing system, which may include hardware, software, and/or firmware for performing many of these steps described above. For example, FIG. 7 is a simplified block diagram of a data processing system 600. Data processing system 600 typically includes at least one processor 602 which communicates with a number of peripheral devices over bus subsystem 604. These peripheral devices typically include a storage subsystem 606 (memory subsystem 608 and file storage subsystem 614), a set of user interface input and output devices 618, and an interface to outside networks 616, including the public switched telephone network. This interface is shown schematically as "Modems and Network Interface" block 616, and is coupled to corresponding interface devices in other data processing systems over communication network interface 624. Data processing system 600 may include a terminal or a low-end personal computer or a high-end personal computer, workstation or mainframe.

Figure 6B:
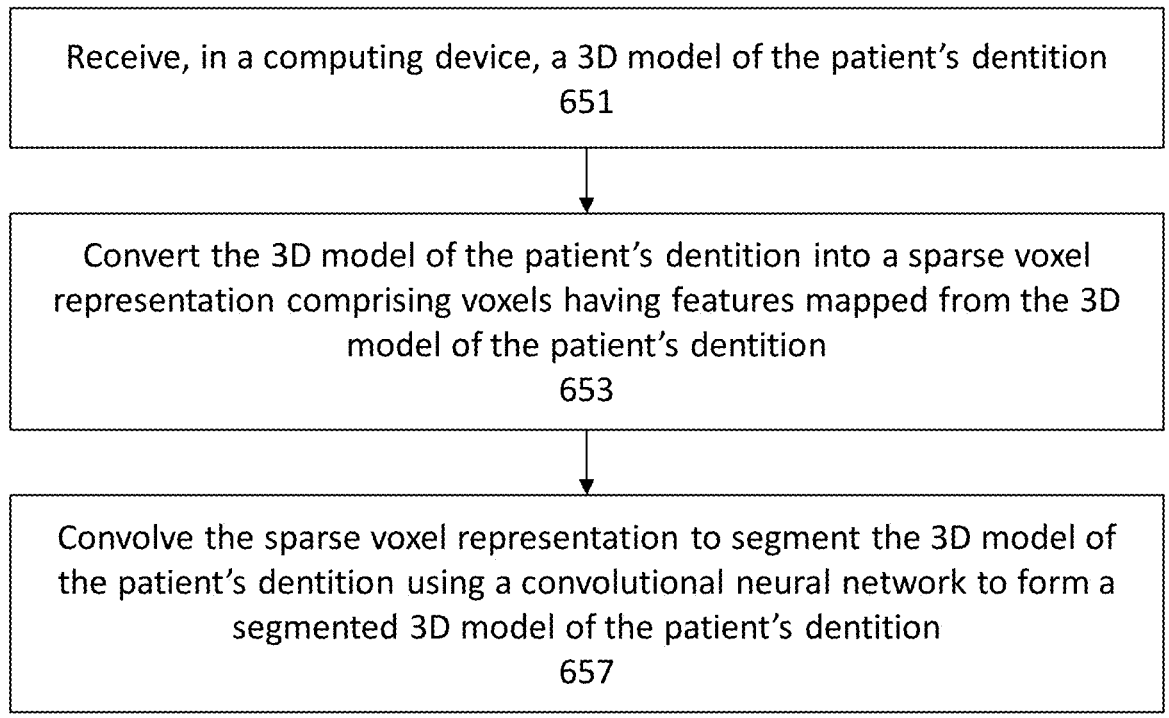
FIG. 6B schematically illustrates an example of a method of segmenting a 3D model of a patient's dentition.

FIG. 6B illustrates another example of a method of analyzing (e.g., segmenting) a three-dimensional (3D) model of a patient's dentition. In this example, method includes receiving the 3D model of the patient's dentition 651. As mentioned, this 3D model may be already in the form of a point cloud, or a point cloud may be generated. Alternatively or additionally the 3D model may be in the form of a mesh or a mesh may be generated. In some examples the 3D model of the patient's dentition includes just the mesh; in some examples it includes both the mesh and the point cloud. The 3D model of the patient's dentition may then be converted into a sparse voxel representation comprising voxels having features mapped from the 3D model of the patient's dentition 653, as described above.

The sparse voxel representation may then be analyzed by convolution using the trained neural network. Thus, the method may include convolving the sparse voxel representation to segment the 3D model of the patient's dentition using a convolutional neural network; this analysis may be used to form a segmented 3D model of the patient's dentition 657. Alternatively in some examples the trained neural network may instead directly process the sparse voxel representation to determine interproximal spacing and/or tooth numbering. Thus, any of the methods and apparatuses described herein may include training the neural network to directly identify interproximal spacing and/or tooth numbering. Thus, in some examples the sparse voxel representation may be applied to a trained machine learning model to recognize segmentation elements corresponding to segmentation of the patient's dentition; this may be done concurrent with or after segmenting the 3D model of the patient's teeth. For example, determining interproximal spacing and/or tooth numbering may be done from the segmented 3D model of the patient's teeth that is produced by the trained neural network.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 606 maintains the basic programming and data constructs that provide the functionality of the present invention. The software modules discussed above are typically stored in storage subsystem 606. Storage subsystem 606 typically comprises memory subsystem 608 and file storage subsystem 614.

Memory subsystem 608 typically includes a number of memories including a main random access memory (RAM) 610 for storage of instructions and data during program execution and a read only memory (ROM) 612 in which fixed instructions are stored. In the case of Macintosh-compatible personal computers the ROM would include portions of the operating system; in the case of IBMcompatible personal computers, this would include the BIOS (basic input/output system).

File storage subsystem 614 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 604 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 620 is responsible for scanning casts of the patient's teeth obtained either from the patient or from an orthodontist and providing the scanned digital data set information to data processing system 600 for further processing. In a distributed environment, scanner 620 may be located at a remote location and communicate scanned digital data set information to data processing system 600 over network interface 624.

Fabrication machine 622 fabricates dental appliances based on intermediate and final data set information acquired from data processing system 600. In a distributed environment, fabrication machine 622 may be located at a remote location and acquire data set information from data processing system 600 over network interface 624.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

While examples of the present disclosure have been shown and described herein, it will be obvious to those skilled in the art that such examples are provided by way of example only. Numerous variations, changes, and substitutions will now occur to those skilled in the art without departing from the invention. It should be understood that various alternatives to the examples of the invention described herein may be employed in practicing the invention. Numerous different combinations of examples described herein are possible, and such combinations are considered part of the present disclosure. In addition, all features discussed in connection with any one example herein can be readily adapted for use in other examples herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one example, the features and elements so described or shown can apply to other examples. It will also be appreciated by those of skill in the art that references to a structure or feature that is disposed "adjacent" another feature may have portions that overlap or underlie the adjacent feature.

Terminology used herein is for the purpose of describing particular examples only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative examples are described above, any of a number of changes may be made to various examples without departing from the scope of the invention as described by the claims. For example, the order in which various described method steps are performed may often be changed in alternative examples, and in other alternative examples one or more method steps may be skipped altogether. Optional features of various device and system examples may be included in some examples and not in others. Therefore, the foregoing description is provided primarily for exemplary purposes and should not be interpreted to limit the scope of the invention as it is set forth in the claims.

The examples and illustrations included herein show, by way of illustration and not of limitation, specific examples in which the patient matter may be practiced. As mentioned, other examples may be utilized and derived there from, such that structural and logical substitutions and changes may be made without departing from the scope of this disclosure. Such examples of the inventive patient matter may be referred to herein individually or collectively by the term "invention" merely for convenience and without intending to voluntarily limit the scope of this application to any single invention or inventive concept, if more than one is, in fact, disclosed. Thus, although specific examples have been illustrated and described herein, any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

What is claimed is:

1. A method of segmenting a three-dimensional (3D) model of a patient's dentition, the method comprising:
  receiving, in a computing device, the 3D model of the patient's dentition;

converting the 3D model of the patient's dentition into a sparse voxel representation comprising voxels having features mapped from the 3D model of the patient's dentition; and convolving the sparse voxel representation to segment the 3D model of the patient's dentition using a convolutional neural network to form a segmented 3D model of the patient's dentition.

2. The method of claim 1, wherein convolving the sparse voxel representation further comprises applying a trained machine learning model to recognize segmentation elements corresponding to segmentation of the patient's dentition.

3. The method of claim 1, wherein features are computed for each voxel based on a mesh representation of the 3D model of the patient's dentition.

4. The method of claim 3, wherein the features that are computed for each voxel are based on one or more of: a sum of normals of mesh faces which map to the voxel, a count of faces mapped to the voxel, a sum of an area from the mesh representation, and an average of angles from the mesh representation.

5. The method of claim 1, wherein convolving comprises using sparse 3D submanifold convolution.

6. The method of claim 1, wherein convolving the spare sparse voxel representation to segment the 3D model comprises generating a predicted segmentation from the sparse voxel representation and applying the predicted segmentation onto the 3D model of the patient's dentition to form the segmented 3D model of the patient's dentition.

7. The method of claim 1, further comprising assigning a tooth number to individually segmented teeth of the segmented 3D model of the patient's dentition.

8. The method of claim 1, further comprising postprocessing of the segmented 3D model of the patient's dentition to correct a tooth numbering.

9. The method of claim 1, wherein the 3D model of the patient's dentition comprises a scan of the patient's dentition.

10. The method of claim 1, further comprising capturing a scan of the patient's dentition with a scanning device and converting the scan into the 3D model of the patient's dentition.

11. The method of claim 1, further comprising outputting one or more of:

interproximal contact distances, teeth numbers and sizes based on the segmented 3D model of the patient's dentition.

* * * * *